United States Patent [19]

Yasui

[11] Patent Number: 4,660,484
[45] Date of Patent: Apr. 28, 1987

[54] STITCH PATTERN INPUT DEVICE FOR SEWING MACHINES

[75] Inventor: Hideo Yasui, Chofu, Japan

[73] Assignee: Tokyo Juki Industrial Co., Ltd., Chofu, Japan

[21] Appl. No.: 834,951

[22] Filed: Feb. 28, 1986

[30] Foreign Application Priority Data

Feb. 28, 1985 [JP] Japan .................................. 60-39504

[51] Int. Cl.⁴ .......................... D05B 3/02; D05B 19/00
[52] U.S. Cl. ................................. 112/457; 112/121.12; 112/121.11; 364/470
[58] Field of Search ...................... 112/121.11, 121.12, 112/457, 453, 121.15, 102, 103, 2; 364/400, 470

[56] References Cited

U.S. PATENT DOCUMENTS

| | | | |
|---|---|---|---|
| 4,329,933 | 5/1982 | Beckerman et al. | 112/121.11 X |
| 4,413,574 | 11/1983 | Hirota et al. | 112/121.12 |
| 4,446,520 | 5/1984 | Shigeta et al. | 112/121.12 X |
| 4,526,116 | 7/1985 | Mannel | 112/121.12 X |

FOREIGN PATENT DOCUMENTS 2097153 10/1982 United Kingdom ........... 112/121.11

Primary Examiner—Peter Nerbun
Attorney, Agent, or Firm—Morgan & Finnegan

[57] ABSTRACT

Stitch patterns are converted into coordinate data by an optical scanner employing a charge coupled device (CCD) which provides multiple PN diodes internally (providing X-direction coordinates), and a pulse motor driven by a predetermined pulse (providing Y-direction coordinates). The coordinate data are stored in random access memory (RAM) via a central processing unit (CPU), thereby eliminating the conventional manual work of inputting data for each stitch point.

4 Claims, 11 Drawing Figures

STITCH PATTERN INPUT DEVICE FOR SEWING MACHINES

BACKGROUND OF THE INVENTION

The invention relates to a stitch pattern inputting device. More particularly, the invention relates to a stitch pattern inputting device employing an image reading device.

In the prior art, stylus pen used for drawing a predetermined stitch pattern on a digitizer was effective to input stitch patterns into an automatic sewing machine. However, such conventional input devices required manual work for inputting and thereby took time, and labor efficiency was, as a result, low.

Further, plotting work with such a stylus and digitizer was not always performed exactly with the same predetermined pattern by each operator, and where the predetermined pattern was very complicated, the labor efficiency was lowered and some mis-plottings were unavoidable and caused input errors.

It is therefore an object of the invention to eliminate the aforementioned demerits and to provide an apparatus for inputting stitch patterns automatically and without manual plotting work, thereby increasing labor efficiency and reducing or eliminating inputting errors.

SUMMARY OF THE INVENTION

These and other objects of the invention are met by providing a stitch pattern scanner employing an image pick-up device which reads a predetermined stitch pattern and converts the pattern into coordinate data. Electronic means are provided to add data for setting the stitch pitch and the stitching order. In a preferred embodiment, the pattern reading device comprises a motor which transmits a drawing in response to a predetermined pulse and a scanner which provides multiple picture elements arranged in a single line in a direction normal to the transferring direction of said drawing and which scans the drawing in response to the predetermined pulse.

BRIEF DESCRIPTION OF THE DRAWINGS

The invention will be described in greater detail below by way of reference to the following drawings, in which.

DETAILED DESCRIPTION OF THE DRAWINGS

One preferred embodiment of the present invention will be explained hereafter referring to the accompanying drawings.

Figure 1:
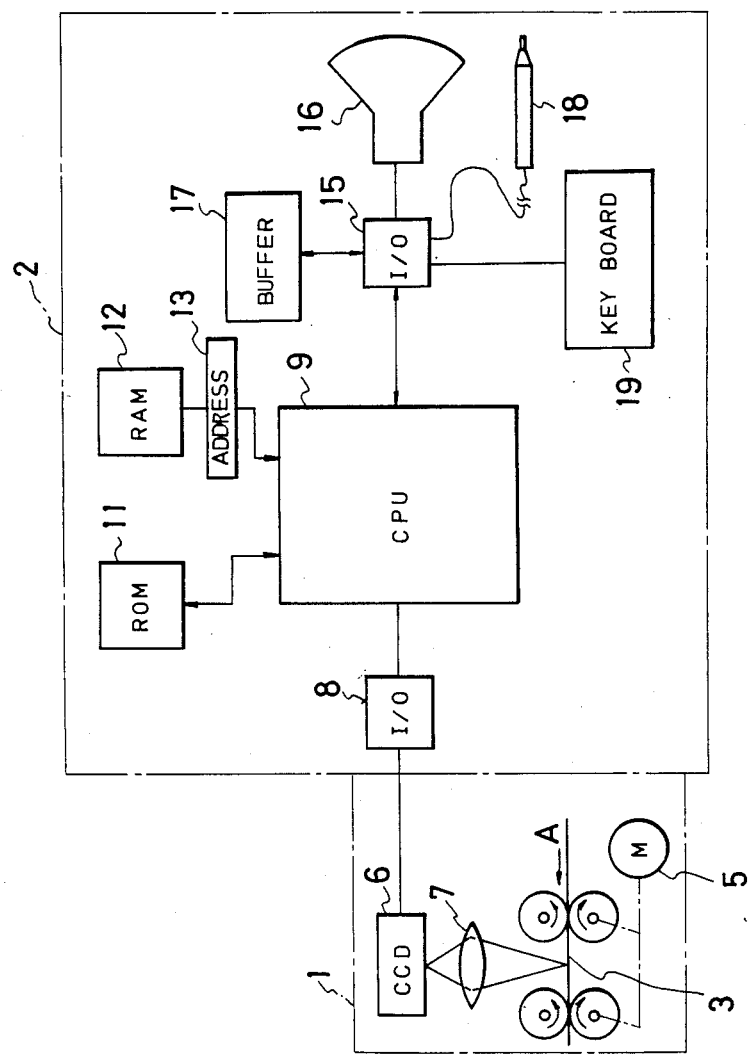
FIG. 1 is a block diagram of an apparatus according to one embodiment of the invention.

FIG. 1 is a block diagram illustrating an apparatus according to the present invention. FIG. 1 is divided into two sections, a stitch pattern reading section 1 and a stitch pattern processing section 2.

The stitch pattern reading section 1 comprises a stepping motor 5 which transfers a drawing of a stitch pattern to be inputted, a pattern scanner 6 in which a charge coupled device (CCD) is provided, and a lens 7. The CCD comprises multiple PN diodes internally.

Discrimination of a picture element for the stitch pattern in the row direction is defined by the number of drive pulses from the stepping motor 5 and discrimination in the column direction is defined by the number of PN diodes in the CCD (charge coupled device).

Output from the scanner 6 is connected to a control section such as a central processing unit 9 (CPU) via an I/O interface 8. Into this control section 9, a read only memory (ROM) 11 which stores the control programs for inputting the stitch patterns and a random access memory (RAM) 12 which stores input pattern data from the stitch pattern reading section are connected. The RAM (random access memory) 12 is connectable to the CPU 9. One example of such a RAM is a floppy disc. Numeral 13 denotes an address circuit which appoints addresses of the RAM 12.

A cathode ray tube (CRT) 16 is connected to the CPU 9 via an I/O interface 15. A buffer memory 17, which buffers indicated data to the CRT 16, a stylus 18 and a keyboard 19 are connected to the CPU 9 through the I/O interface 15.

Figure 2:
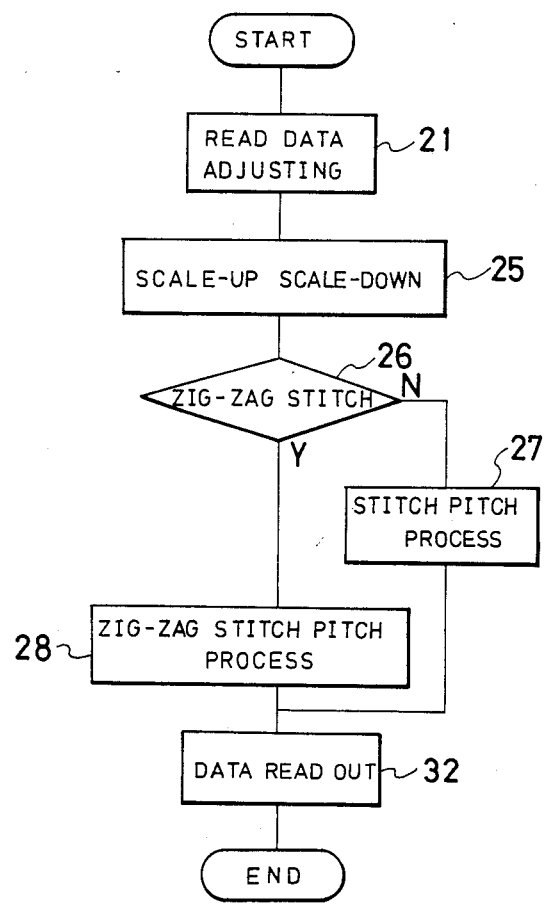
FIG. 2 is a control flow chart of one embodiment according to the invention.

FIG. 2 illustrates a control flowchart of an apparatus according to the present invention. FIG. 3-FIG. 11 illustrate how stitch patterns are inputted in an apparatus according to the invention.

Under the above described embodiment of the present invention, one characteristic way of operation will be explained hereinafter. A function key at the keyboard 19 issues a command to read the stitch pattern. Thereby, the "read pattern" mode is invoked, and the stitch pattern reading section 1 is placed in an "on" condition (refer to block 21 of FIG. 2).

The stepping motor 5 is driven by predetermined pulse, and feeds the drawing 3 under the pattern scanner 6. The pattern scanner 6 scans the stitch pattern through lens 7, in synchronization with the drive pulse, by multidiodes which are arranged in one line in direction normal to the feeding direction, and outputs the stitch pattern as a low level signal. A low level signal is emitted because the stitch patterns are generally drawn with black lines on white paper.

Figure 3:
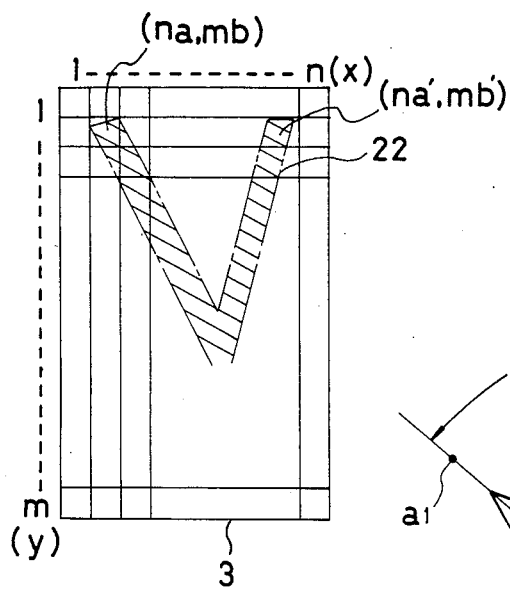
FIG. 3 illustrates the principles of reading an original drawing in an embodiment according to the invention.

The process of drawing a pattern in accordance with the invention is explained with regards to FIG. 3. The drawing of FIG. 3 is divided into m sections in the row direction (Y-direction), the number m corresponding to the drive pulse number. The drawing of FIG. 3 is further divided into n sections in the column direction (X-direction), the number n corresponding to the number of diodes in the CCD. Thus, the drawing of FIG. 3 is divided into m×n picture elements.

For example, portion 22 of the stitch pattern of FIG. 3 is scanned by the pattern scanner 6 and is outputted as a low level signal. Simultaneously, the coordinate data of each picture element (na, mb) (na', mb') is outputted from the stitch pattern reading section 1. These pattern data are stored in RAM (random access memory) 12. Memory data in the RAM 12 are transmitted into a buffer-memory 17, and the inputted stitch pattern may be displayed on the CRT 16.

Figure 4:
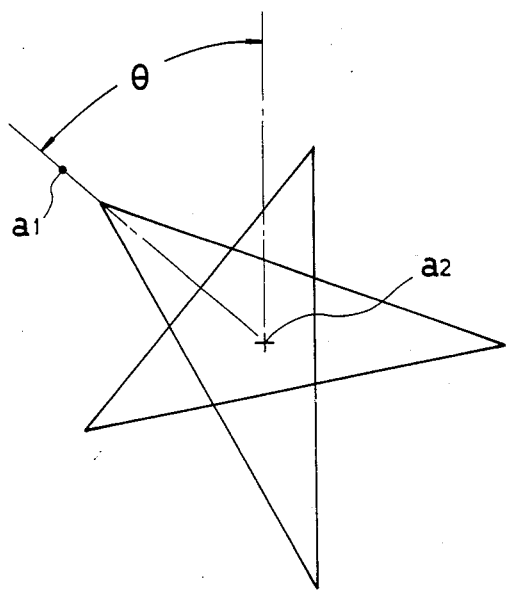
FIG. 4–FIG. 11 illustrate how a stitch pattern is inputted into a central processing unit using a cathode ray tube and a stylus in an embodiment according to the invention.

When the stitch pattern is read in a deformed condition because the original drawing was angularly mispositioned or the original drawing was rotated as shown in FIG. 4, a function key at the keyboard 19 may be pressed to issue a command such as "rotational correction mode". By this action, the mode may be switched to the "rotational correction mode", and the following steps would be followed in the operating section 2 (block 21). When the stitch pattern was mis-read and was mis-displayed on CRT 16 (for example, as the pattern was mis-positioned angularly as shown in FIG. 4) at first, the stylus pen 18 is used by the operator to indicate the center $a_2$ of rotation. The operator then indicates the reference point $a_1$. Thereby, the control section 9 calculates the angle of modification $\theta$ and referring to this angle $\theta$, the pattern data are converted to polar coordinates.

Figure 5:
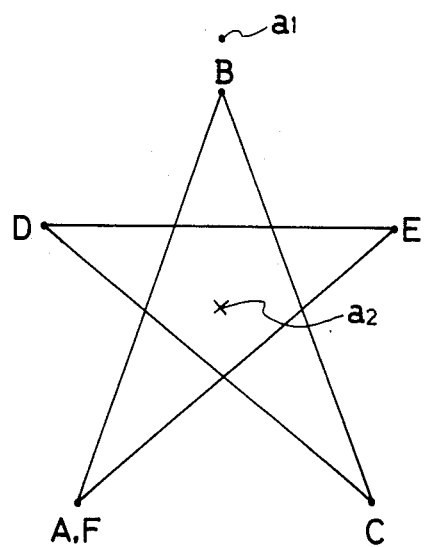
Figure 7:
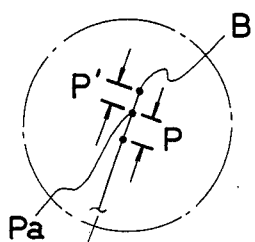

Based on the result of the conversion, each coordinate data of the stitch pattern are converted, and the pattern data stored in RAM 12 are thereby renewed. The renewed pattern data in RAM 12 are transmitted to the buffer memory 16, and the corrected stitch pattern is displayed on the CRT 17 as FIG. 5 shows. The machine operator can then visually appreciate that the stitch pattern is correct.

For another example, when the corrected pattern is displayed oversizedly beyond the area of the CRT 16, the stylus pen 18 indicates the translation point and simultaneously the displayed drawing is parallel transformed. The control section 9 calculates the following conversion per each picture element, and thus coordinate transformations are executed.

$$X_o = X' + x_o \cos \theta - Y_o \sin \theta \quad (1)$$

$$Y_o = Y' + x_o \sin \theta - y_o \cos \theta \quad (2)$$

$X_o$, $Y_o$ define the coordinate data of the renewed picture element; $x_o$, $y_o$ define the coordinate data of the original picture element (before renewal); $x'$, $y'$ define the parallel displacement of the drawing.

When the corrected pattern is to be scaled-up or scaled-down, the keyboard 19 commands "scale-up" or "scale-down" and inputs the magnifying or contracing factor $\alpha$. Then, the operating section 2 executes a scale-up or scale-down program, and the pattern data in the RAM 12 are renewed (block 25). The renewed data are transmitted to the buffer memory 17, and the scaled-up or scaled-down patterns are displayed on the CRT 16.

When the machine operator enters the data for a bar-tack sewing machine, the operator indicates stitch pitch "P" on the corrected stitch pattern using the function key at the keyboard 19. By so doing, the pitch execution mode is followed (block 26, 27). The machine operator, using the stylus 18, inputs start point A (see FIG. 5), and turning point B, C, D, E, F, in order of the stitching process. Then, these data are written into the stitch pattern data in the RAM 12 as additional data bits which indicate the stitching order A-B-C-D-E-F. Under such a condition, the stitch pitches for steps A-B, B-C, C-D, D-E, E-F are calculated, and the coordinate data for the needle point are determined.

Figure 6:
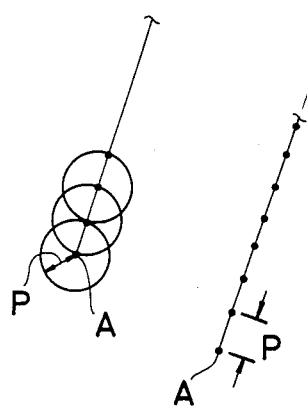

FIG. 6 illustrates that the inter-section point between a circle line drawn keeping "A" as the center with a radius P, and the stitch line, is the needle point. The same process may be followed for points B, C, D, E, and if the keyboard 19 is commanding "adjusting of the stitch pitch", and the last pitch is defined as P', to terminate the last pitch on point B, (shown in the dotted line circle on FIG. 7), the stitch pitch is adjusted. If P' is longer than half of the stitch pitch ($P' > \frac{1}{2}P$), then the adjusted stitch pitch $P_o$, is determined as follows:

$$P_o = P - (P - P')/N \quad (3)$$

and if P' is shorter than half of the stitch pitch ($P' < \frac{1}{2}P$), $$P_o = P + P'/N \quad (4)$$

where N equals the number of stitches to the needle point $P_a$ (the last stitch point).

The same calculation for adjusting the stitch pitch may be followed from point A to the last point F. Each point corresponding to the points of the pattern data in the RAM 12 may be provided (added) with an extra data bit (flag bit) (refer to FIG. 2, block 27).

When stitching is performed by the pattern data stored in RAM 12, at first the stitching order from A to F are determined according to the extra data (flag bit) by the control section (not shown). Likewise, the stitch points between these points (A, B, C, D, E, F) are determined by the extra data (flag bit), and the coordinate data of these stitch points are read out from the RAM 12. Referring to these coordinate data, stitching is automatically performed.

Figure 8:
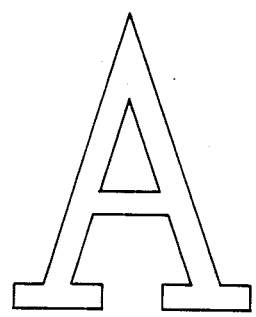
Figure 9:
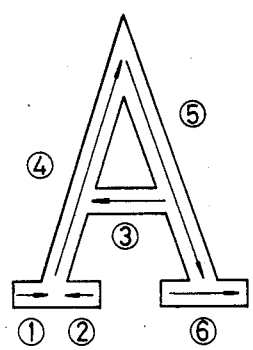

When a stitch pattern as shown on FIG. 8 is to be inputted, and zig-zag stitch data is to be performed, the keyboard 19 commands zig-zag stitching and the following procedures are performed (see FIG. 2, block 26, 28). At first, the machine operator pre-determines a zig-zag stitch method, for example, as shown in FIG. 9, and following this method, the stitch start point, the stitch end point, the direction of stitch, and the thread pitch for each point ( 1  2  3  4  5  6 on FIG. 9) are inputted. Thus, the pattern data are made. Such a data-making process is explained by reference to an enlarged point  1  of FIG. 9 as shown in FIG. 10.

The machine operator, using the stylus, inputs on the stitch pattern displayed on CRT 16, the stitch start point $S_1$, the first direction of zig-zag $S_2$, and the last stitch point $S_3$. The thread pitch r is inputted via the keyboard 19. With these inputs, the control section 9 divides the distance $S_2$-$S_3$ by r and adds additional data (flag bits) which indicates a stitch point to the corresponding point in RAM 12. Further, each stitch point is transmitted in parallel with stitch line 31 on which the stitch start point S falls, and additional data (flag bits) which indicate the stitch point for each point in RAM 12 are added. Further, the additional data (flag bits) for indicating the stitching order are added.

The same procedure for inputting points  2 - 6  are followed. For instance, in point  2 , dummy stitch points $S_5$, $S_6$, and stitch start point $S_7$ are inputted using the stylus 18.

Figure 10:
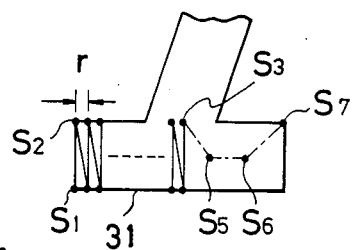
Figure 11:
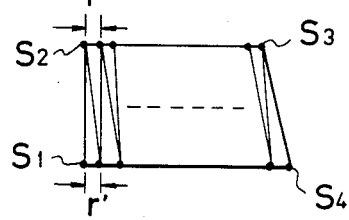

When the stitch pattern as shown in FIG. 11 is to be zig-zag sewed, the stitch start point $S_1$, $S_2$, which defines the first direction of zig-zag stitch, and the stitch end point $S_3$, are inputted by the stylus 18 as explained in the case of the drawing of FIG. 10, and the thread pitch r between $S_2$ and $S_3$ is inputted by the keyboard 19.

When the first direction of zig-zag stitching and the last direction of zig-zag stitching are different, point $S_4$, which defines the last direction of zig-zag stitch, is inputted with the stylus 18. With this input, the control section 9 divides the distance $S_2$-$S_3$ by the thread pitch r, and thus stitch points are defined. Stitch points in RAM 12 corresponding to these stitch points are added with additional data (flag bit). Further, the distance $S_1$-$S_4$ is divided by the above stitch numbers, and each stitch point in RAM 12 corresponding to these stitch points are added with additional data for determining the stitching order (flag bits).

As aforementioned, according to this invention, the stitch pattern is scanned and read by the pattern scanner (image scanner), and the pattern data are added with necessary data and are stored in the RAM 12. Thereby, reading out the stored data from the RAM 12, a control section (not shown in the drawings) connected to the RAM 12 can stitch automatically in accordance with these pattern data (block 32).

As aforementioned, according to the invention, the stitch pattern is read automatically by the pattern scanner provided with the image pick-up device and the necessary additional data are added programmably to the pattern data. Thereby, compared to the conventional way of drawing the stitch pattern on the digitizer with a stylus, the invention is effective for increasing labor efficiency, for avoiding manual error, and for accurately inputting multiple and complicated stitch patterns.

As many apparently widely different embodiments of the invention may be made without departing from the spirit and scope therein, it is to be understood that invention is not limited to the specific embodiments described herein and is to be defined only in accordance with the appended claims.

I claim:

1. A stitch pattern input device, comprising pattern reading means for converting a printed stitch pattern into coordinate data; storage means for storing said coordinate data obtained by said pattern reading means as pattern data; indicating means for displaying the stitch pattern and input means for indicating stitch points and stitching order of the stitch pattern on the indication means and operational means for adding stitch point data and stitching order data obtained by said input means to said pattern data.

2. A stitch pattern inputting device, as recited in claim 1, in which said pattern reading means comprises:
   a motor which transfers a drawing in response to a predetermined pulse, and a scanner which provides multiple picture elements arranged in a single line in a direction normal to the transferring direction of said drawing and which scans said drawing in response to said predetermined pulse.

3. A stitch pattern inputting device, as recited in claim 2, wherein said pattern reading means includes a charge-coupled device including a plurality of internal diodes.

4. A stitch pattern inputting device, as recited in claim 1, further comprising means for calculating said stitch pitch data and said stitch order data.

* * * * *